Patented Oct. 4, 1932

1,880,813

UNITED STATES PATENT OFFICE

MAYNE R. COE, OF WASHINGTON, DISTRICT OF COLUMBIA, DEDICATED TO THE FREE USE OF THE GOVERNMENT AND THE PUBLIC

PROCESS OF PRESERVING OIL BEARING COMMODITIES

No Drawing. Application filed December 4, 1930. Serial No. 500,133.

(GRANTED UNDER THE ACT OF MARCH 3, 1883, AS AMENDED APRIL 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the public, to take effect upon the granting of a patent to me.

My invention relates to the preservation of oils, fats, and waxes and to all materials containing such substances. It is well known that foods, feedstuffs, and all commodities bearing oils, fats, or waxes, are subject to rancidity thereby affecting adversely the natural agreeable flavor and quality and in advance stages destroying the food or other value of the material or its usefulness.

I have discovered that rancidity is due to certain wave lengths of light occasioned by photochemical action on certain reactive substances in the oils, fats, and waxes. The effect of these wave lengths of light insofar as rancidity is concerned is eliminated by the use of protective materials having the faculty of excluding or absorbing them. These protective materials may or may not be transparent. My experiments disclose that green or black protective material or the foils are effective in preventing or retarding the progress of rancidity while transparent protective materials of the colors red, pink, blue, or orange, are ineffective in this respect and further that purple or yellow transparent containers catalyze the photochemical reaction resulting in rancidity. These experiments show that the exclusion or reduction of those portions of the spectrum lying outside that region of the spectrum bounded by wave lengths 4900 Ångströms to 5600 Ångströms prevents or retards the progress of rancidity in commodities bearing oils, fats, and/or waxes. This may be accomplished by excluding all light by enclosing the commodity in foil; by the absorption of all light waves by enclosing the commodity within a black screen; or by enclosing the commodity within a green protective screen whereby the particular wave lengths above described causing rancidity are absorbed and excluded.

The protective materials above referred to also include chemical means of a character capable of absorbing those rays of light which cause rancidity as hereinbefore disclosed, added to the commodity to be preserved.

While it is realized that my invention can be utilized in various ways, the following example of its use as practiced by me is given merely as an illustration in furtherance of clarity, it being understood that I do not wish to limit myself to the particular method disclosed since it is obvious that the invention may be used by other methods and the same result obtained:

Example

Various foods containing oils, fats, or waxes, such as butter, potato chips, or cattle feeds, are wrapped in a fast color green transparent or translucent paper or material or in black glazed paper or material, the wrapper being retained in place by twisting the ends or by fastening it in any convenient way.

It has also been ascertained that the use of the protective materials effective in retarding or preventing rancidity as disclosed above is of considerable value in maintaining the natural color of the commodity protected.

Having fully disclosed my discovery, I claim as my invention:

1. The process of preserving foods, feedstuffs, and other commodities subject to rancidity by the exclusion or absorption of all light except that having wave lengths lying between 4900 and 5600 Ångströms of the spectrum.

2. The process of preserving foods, feedstuffs, and other commodities subject to rancidity by the exclusion or absorption with a protective screen of all light except that having wave lengths lying between 4900 Ångströms and 5600 Ångströms of the spectrum.

3. The process of preserving foods, feedstuffs, and other commodities subject to rancidity comprising enclosing such foods, feedstuffs, and other commodities, in containers which admit only those wave lengths of light lying between 4900 and 5600 Ångströms of the spectrum.

4. The process of preserving foods, feedstuffs, or other commodities subject to rancidity comprising enclosing such foods, feedstuffs, or other commodities, in green containers which admit only those wave lengths of light lying between 4900 and 5600 Ångström units of the spectrum.

5. The process of preserving foods, feedstuffs, or other commodities against rancidity which comprises the step of adding to the commodity a chemical means adapted to absorb all light except that having wave lengths lying between 4900 and 5600 Ångströms of the spectrum.

6. A new article of manufacture comprising food, feedstuffs, or other commodities subject to rancidity enclosed in containers which admit only wave lengths of light lying between 4900 and 5600 Ångströms of the spectrum.

7. A new article of manufacture comprising food, feedstuffs, or other commodities subject to rancidity enclosed in green containers which admit only those wave lengths of light lying between 4900 and 5600 Ångström units of the spectrum.

MAYNE R. COE.